United States Patent
Gregory et al.

(10) Patent No.: US 11,686,032 B2
(45) Date of Patent: Jun. 27, 2023

(54) USER-INTERFACE SYSTEM FOR A LAUNDRY APPLIANCE

(71) Applicant: WHIRLPOOL CORPORATION, Benton Harbor, MI (US)

(72) Inventors: William Gregory, St. Petersburg, FL (US); Alexander Halbleib, Benton Harbor, MI (US); Barry Steven Hazell, Ottawa (CA); Christopher A. Jones, St. Joseph, MI (US); James Mann, St. Petersburg, FL (US); Dennis Scott Prows, Lutz, FL (US)

(73) Assignee: Whirlpool Corporation, Benton Harbor, MI (US)

( * ) Notice: Subject to any disclaimer, the term of this patent is extended or adjusted under 35 U.S.C. 154(b) by 505 days.

(21) Appl. No.: 16/812,732

(22) Filed: Mar. 9, 2020

(65) Prior Publication Data

US 2020/0347536 A1    Nov. 5, 2020

Related U.S. Application Data

(60) Provisional application No. 62/840,680, filed on Apr. 30, 2019.

(51) Int. Cl.
*H04R 1/00* (2006.01)
*D06F 34/00* (2020.01)
(Continued)

(52) U.S. Cl.
CPC .............. *D06F 34/34* (2020.02); *D06F 34/32* (2020.02); *D06F 39/14* (2013.01); *G06F 3/162* (2013.01);
(Continued)

(58) Field of Classification Search
CPC ... H04R 1/00; H04R 1/04; H04R 1/08; H04R 1/028; H04R 1/326; H04R 3/00; H04R 3/005; D06F 34/00; D06F 34/08; D06F 34/28; D06F 34/32; D06F 34/34; D06F 33/00; D06F 39/14; D06F 2101/00; D06F 2105/58; D06F 2105/60; D06F 37/28; G10L 15/22; G10L 2015/223
See application file for complete search history.

(56) References Cited

U.S. PATENT DOCUMENTS 4,520,576 A    6/1985  Vander Molen
5,694,793 A    12/1997 Nishimura et al.
(Continued)

FOREIGN PATENT DOCUMENTS

CN    207998726 U    10/2018
DE    3503141 A1     8/1986
(Continued)

*Primary Examiner* — Thang V Tran
(74) *Attorney, Agent, or Firm* — Price Heneveld LLP

(57) ABSTRACT

A laundry appliance includes a cabinet. A door is coupled to the cabinet. The door is operable between a closed position and an opened position. A microphone assembly is coupled to the door. The microphone assembly is configured to receive a voice command. A microcontroller is coupled to the door. The microcontroller is operably coupled to the microphone assembly and the microcontroller. A proximity sensor is coupled to the microphone assembly. The proximity sensor defines a sensor field that extends outward from the door.

20 Claims, 12 Drawing Sheets

(51) Int. Cl.
*G06F 3/16* (2006.01)
*G10L 15/22* (2006.01)
*D06F 34/34* (2020.01)
*D06F 34/32* (2020.01)
*D06F 39/14* (2006.01)
*H04R 1/04* (2006.01)
*H04R 1/08* (2006.01)
*D06F 105/58* (2020.01)

(52) U.S. Cl.
CPC ............... *G10L 15/22* (2013.01); *H04R 1/04* (2013.01); *H04R 1/08* (2013.01); *D06F 2105/58* (2020.02); *G10L 2015/223* (2013.01)

(56) References Cited

U.S. PATENT DOCUMENTS

| | | | |
|---|---|---|---|
| 6,549,632 | B1 | 4/2003 | Akino et al. |
| 7,342,492 | B2 | 3/2008 | Ludenia |
| 8,564,158 | B2 | 10/2013 | Poyner et al. |
| 8,627,581 | B2 | 1/2014 | Brown |
| 8,654,515 | B2 | 2/2014 | Krische |
| 8,976,126 | B2 | 3/2015 | Kim et al. |
| 9,521,475 | B2 | 12/2016 | Lin et al. |
| 9,881,757 | B2 | 1/2018 | Hwang et al. |
| 10,094,065 | B2 | 10/2018 | Kim et al. |
| 10,599,392 | B2 | 3/2020 | Jeon et al. |
| 2003/0161490 | A1 | 8/2003 | Maase |
| 2007/0298405 | A1 | 12/2007 | Ebrom et al. |
| 2008/0037275 | A1 | 2/2008 | Eblenkamp et al. |
| 2015/0192915 | A1 | 7/2015 | Seo et al. |
| 2015/0194283 | A1* | 7/2015 | Hwang ............... H01H 47/001 307/116 |
| 2015/0198940 | A1 | 7/2015 | Hwang et al. |
| 2015/0345065 | A1 | 12/2015 | Yang et al. |
| 2016/0116891 | A1 | 4/2016 | Megger et al. |
| 2016/0258104 | A1 | 9/2016 | James |
| 2018/0305851 | A1 | 10/2018 | Kwon et al. |
| 2018/0334767 | A1 | 11/2018 | Kim et al. |
| 2019/0145041 | A1 | 5/2019 | Bhandare et al. |
| 2019/0198021 | A1 | 6/2019 | Lee et al. |
| 2019/0211489 | A1 | 7/2019 | An et al. |
| 2019/0214009 | A1 | 7/2019 | An et al. |
| 2019/0284745 | A1 | 9/2019 | Yang |
| 2020/0020336 | A1 | 1/2020 | Lee |
| 2020/0043494 | A1 | 2/2020 | Maeng |
| 2020/0240066 | A1* | 7/2020 | Ko ........................... D06F 34/32 |
| 2020/0362497 | A1* | 11/2020 | Park ........................ D06F 33/32 |

FOREIGN PATENT DOCUMENTS

| | | |
|---|---|---|
| EP | 3263758 A1 | 1/2018 |
| EP | 3613887 A1 | 2/2020 |
| GB | 2313924 A | 12/1997 |
| JP | 6373653 B2 | 8/2018 |
| KR | 20140095779 A | 8/2014 |
| WO | 2015055239 A1 | 4/2015 |

\* cited by examiner

USER-INTERFACE SYSTEM FOR A LAUNDRY APPLIANCE

CROSS-REFERENCE TO RELATED APPLICATION

This application claims priority to and the benefit under 35 U.S.C. § 119(e) of U.S. Provisional Patent Application No. 62/840,680, filed on Apr. 30, 2019, entitled "USER-INTERFACE SYSTEM FOR A LAUNDRY APPLIANCE", the entire disclosure of which is hereby incorporated herein by reference.

FIELD OF THE DISCLOSURE

The present disclosure generally relates to a user-interface system, and more specifically, to a user-interface system for a laundry appliance.

BACKGROUND OF THE DISCLOSURE

Laundry appliances typically include a user-interface for a user to enter commands to control the laundry appliance. The user-interface may include a microphone, which allows the user to control the laundry appliance via voice commands. Additionally, user-interfaces may include a visual indicator, such as a display screen.

SUMMARY OF THE DISCLOSURE

According to one aspect of the present disclosure, a laundry appliance includes a cabinet. A door is coupled to the cabinet. The door is operable between a closed position and an opened position. A microphone assembly is coupled to the door. The microphone assembly is configured to receive a voice command. A microcontroller is coupled to the door. The microcontroller is operably coupled to the microphone assembly. A proximity sensor is coupled to the microphone assembly and the microcontroller. The proximity sensor defines a sensor field that extends outward from the door.

According to another aspect of the present disclosure, an appliance door includes a door panel that has an outer surface and an inner surface. The door panel defines an elongated channel that is configured as a handle. An audio interface is disposed proximate the handle. The audio interface includes a speaker and a microphone printed circuit board assembly that has at least one microphone. A visual interface is coupled to the inner surface of the door. The visual interface is configured to display messages on the outer surface of the door.

According to another aspect of the present disclosure, a door assembly includes a door panel that forms a handle. A printed circuit board is coupled to the door panel proximate the handle. A plurality of microphones is coupled to a printed circuit board. An acoustic layer is coupled to the printed circuit board. Each microphone aligns with a microphone port aperture that is defined by the acoustic layer. A cover member is disposed at least partially within the handle. The cover member is disposed adjacent to the acoustic layer.

These and other features, advantages, and objects of the present disclosure will be further understood and appreciated by those skilled in the art by reference to the following specification, claims, and appended drawings.

Figure 1:
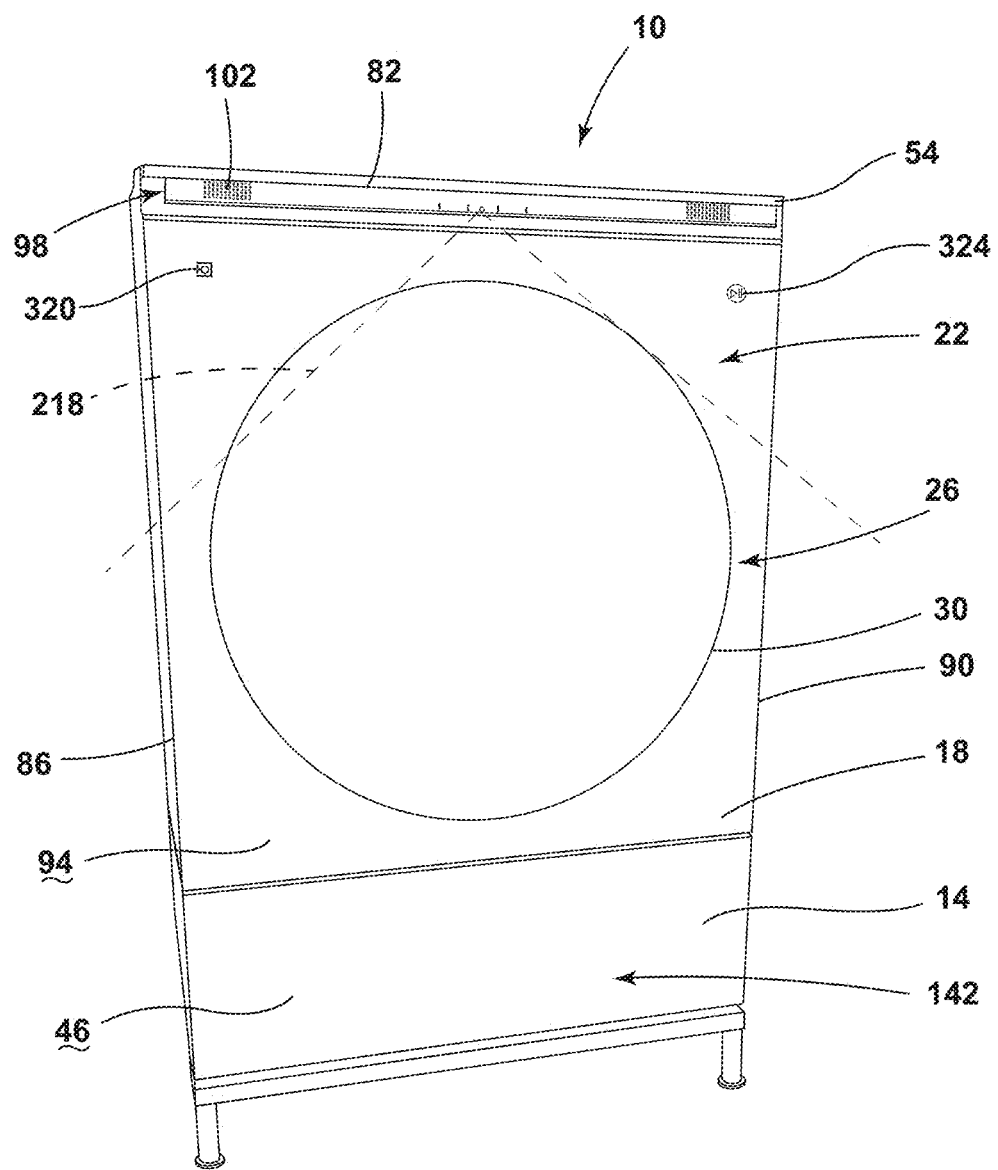
FIG. 1 is a front perspective view of a laundry appliance with a door in a closed position, according to at least one example.

The components in the figures are not necessarily to scale, emphasis instead being placed upon illustrating the principles described herein.

DETAILED DESCRIPTION

The present illustrated embodiments reside primarily in combinations of method steps and apparatus components related to a microphone assembly for a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front"

shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates a laundry appliance including a cabinet 14 and a door 18 rotatably coupled to the cabinet 14. A user-interface system 22 is coupled to the door 18 and includes a visual interface 26 defining a light ring 30 and an audio interface 34. The audio interface 34 includes a microphone assembly 38. The user-interface system 22 includes a microcontroller 42 operably coupled to the visual and audio interfaces 26, 34.

Figure 2:
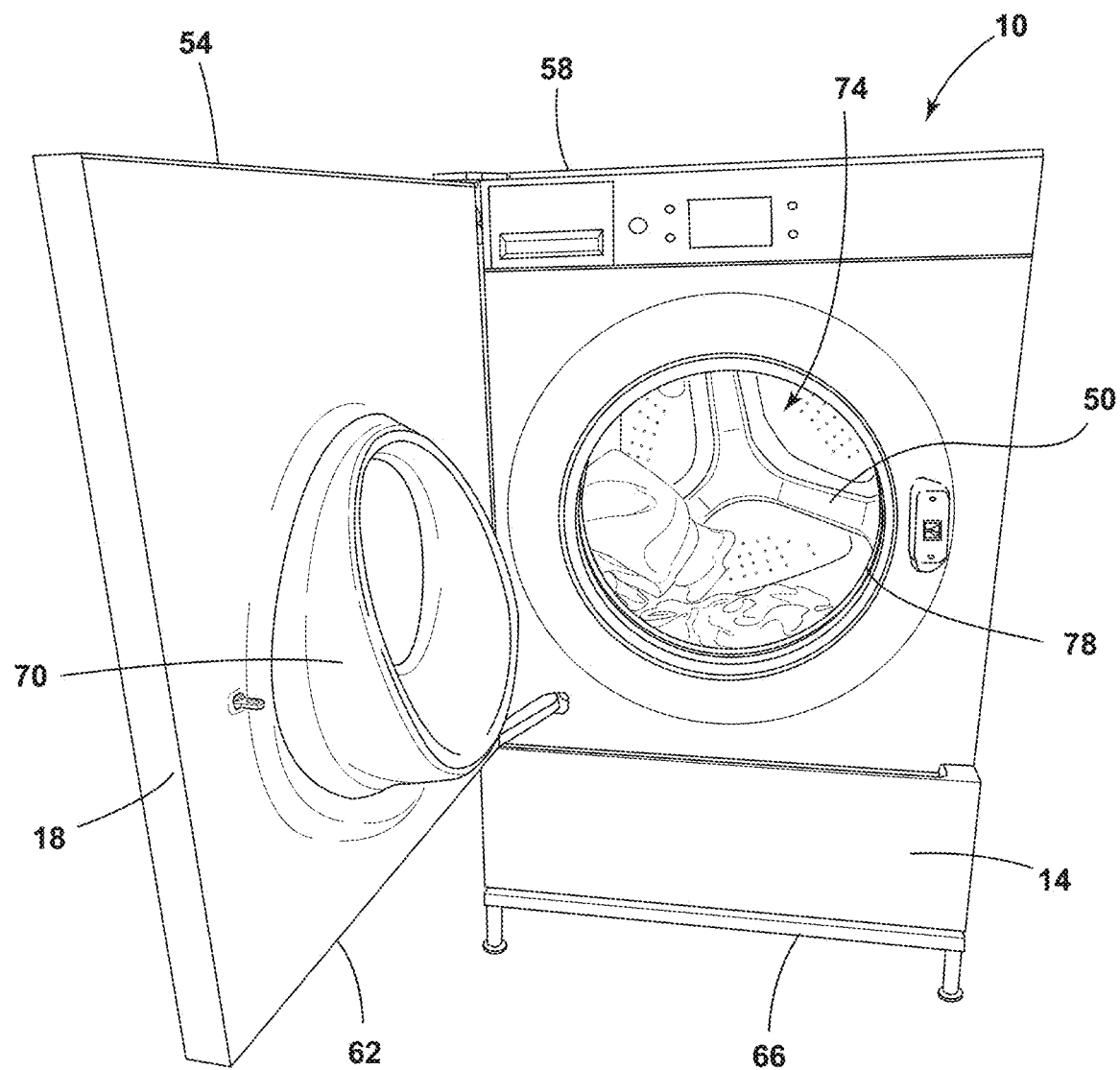
FIG. 2 is a front perspective view of the laundry appliance with the door in an opened position, according to at least one example.

Referring to FIGS. 1 and 2, the laundry appliance 10 includes the cabinet 14 having a front surface 46 and a door 18 rotatably coupled to the cabinet 14. The door 18 may be a flat panel door, a fishbowl-style door, and/or a combination thereof. As illustrated in the exemplary embodiment in FIG. 1, the laundry appliance 10 is a front-load, horizontal axis laundry appliance 10. However, the laundry appliance 10 may be a washer, dryer, and/or a combination thereof. For example, the laundry appliance 10 can be a top-load laundry appliance 10 or another configuration of a front-load laundry appliance 10. The door 18 is operable between opened and closed positions. The door 18, in the exemplary embodiment of FIG. 1, opens in a side-to-side manner, however, it is contemplated that the door 18 can open in an up-and-down manner. The door 18 is configured to allow access to a drum 50 positioned within the cabinet 14 when in an opened position, and encloses the drum 50 when in the closed position.

In various examples, a top edge 54 of the door 18 is substantially coplanar with a top surface 58 of the cabinet 14. A decorative panel may also be placed over the top surface 58 of the cabinet 14 and the top edge 54 of the door 187. Additionally or alternatively, a bottom edge 62 of the door 18 is spaced-apart from a bottom surface 66 of the cabinet 14. However, it is contemplated that the bottom edge 62 of the door 18 can be coplanar with the bottom surface 66 of the cabinet 14.

As illustrated in FIGS. 1 and 2, the door 18 (e.g., a door panel) has a substantially rectangular shape. The shape of the door 18 substantially aligns with the shape of the cabinet 14. In other words, the door 18 and the front surface 46 of the cabinet 14 have substantially similar shapes. Alternatively, the door 18 and the front surface 46 of the cabinet 14 may have different shapes. In such examples, the door 18 can have a substantially circular or oblong shape.

In certain aspects, a rear surface of the door 18 defines and/or includes a deflector 70. In particular, where the appliance has a washing function, the door 18 typically includes the deflector 70. When the door 18 is in the closed position, the deflector 70 extends into the drum 50 via an opening 74 in the front surface 46 of the cabinet 14. The deflector 70 is advantageous for deflecting laundry away from the door 18 or a bellows assembly 78, which is positioned about the perimeter of the opening 74 of the cabinet 14.

While illustrated as the door 18 for the laundry appliance 10, it is also contemplated that the door 18 may be included on other appliances, such as, for example, a dishwasher, an oven, a refrigerating appliance, a countertop appliance, etc.

Figure 3:
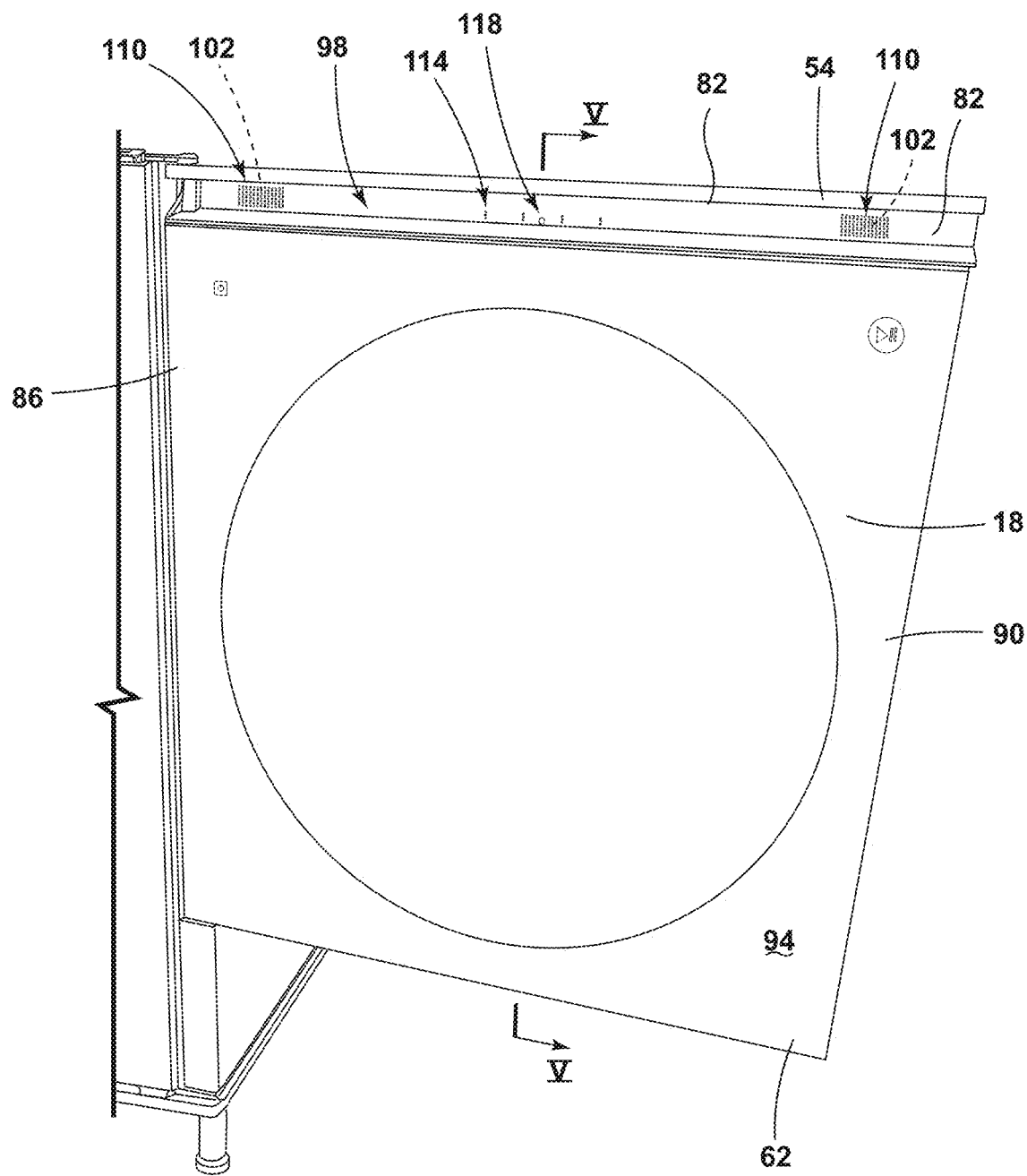
FIG. 3 is a front perspective view of an outer surface of the door in the opened position, according to at least one example.

Referring to FIG. 3, the door 18 includes a handle 82 adjacent to the top edge 54 of the door 18. It is contemplated that the handle 82 may be located in other locations on the door 18, such as, for example, proximate to a left or a right side edge 86, 90 of the door 18. An outer surface 94 of a rear panel of the door 18 partially defines an elongated cavity or channel 98 proximate the handle 82, which is typically positioned adjacent to the top edge 54 of the door 18. The door 18 can provide for a variety of configurations of the elongated channel 98. For example, the elongated channel 98 often extends between the left side edge 86 to the right side edge 90 of the door 18. Typically, the elongated channel 98 extends the entire distance between the left and right side edges 86, 90. It is further contemplated that the elongated channel 98 may extend in a different direction along the door 18, such as, for example, between the top edge 54 and the bottom edge 62 of the door 18.

Figure 4:
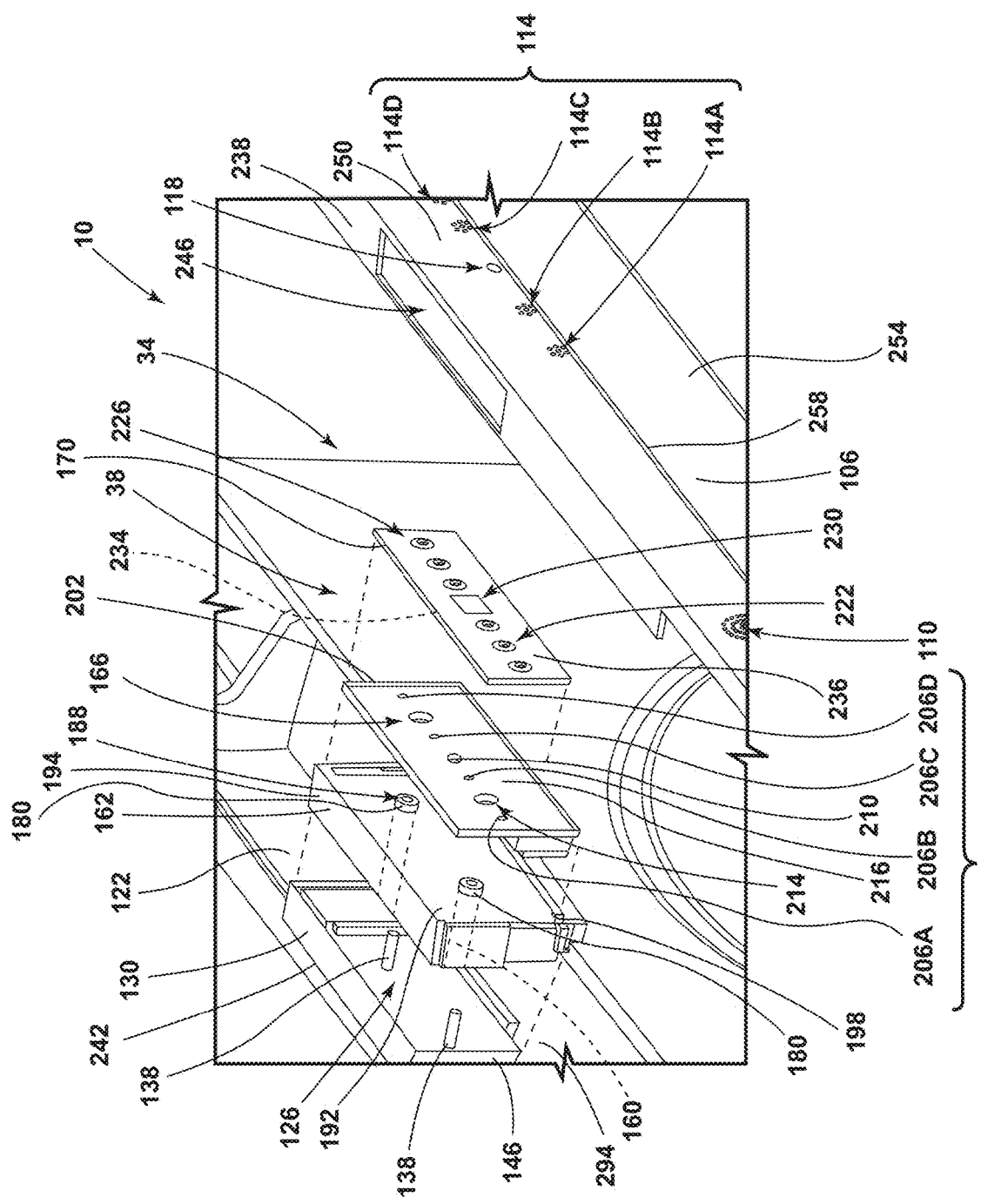
FIG. 4 is an exploded perspective view of a microphone assembly, according to at least one example.

Referring to FIGS. 3 and 4, the microphone assembly 38 and at least one speaker 102 are coupled to the door 18 proximate the handle 82 and are in auditory communication with the handle 82. As illustrated in FIG. 3, the laundry appliance 10 includes two speakers 102. One speaker 102 is positioned adjacent to the left side edge 86 and the other speaker 102 is positioned adjacent to the right side edge 90 of the door 18 within the elongated channel 98. The configuration of the microphone assembly 38 and the speakers 102 can depend on a variety of factors. More or fewer speakers 102 may be included without departing from the teachings herein. The microphone assembly 38 is disposed proximate the handle 82 and is disposed between speakers 102.

A cover member 106 at least partially defines the elongated channel 98. The elongated channel 98 is defined between the cover member 106 and the door 18. The cover member 106 and defines speaker apertures 110 for an audio output to be communicated to a user. The cover member 106 additionally defines microphone apertures 114 for an input (e.g., a voice command) to be communicated from a user to the microphone assembly 38.

The cover member 106 can have a variety of configurations based on a number of factors, including, for example, the configuration of the microphone assembly 38 and the speakers 102. For example, as illustrated in FIGS. 3 and 4, the cover member 106 defines four microphone apertures 114A-114D, collectively referred to as the microphone apertures 114. However, the number of microphone apertures 114 may be greater or fewer based on the configuration of the microphone assembly 38. Additionally, the cover member 106 defines a sensor aperture 118 disposed among the microphone apertures 114 and typically between the microphone apertures 114B, 114C. The sensor aperture 118 may be the same size or a different size than the microphone apertures 114. Each of the speaker apertures 110, the microphone apertures 114, and the sensor aperture 118 may be a single aperture or a plurality of apertures without departing from the teachings herein.

Referring to FIGS. 1 and 4-6, the door 18 includes a channel interior surface 122 defining a pocket 126. The pocket 126 is typically molded into the door 18, such that the pocket 126 is integrally formed with the door 18. Other configurations are also contemplated based on the configuration of the microphone assembly 38. The pocket 126 can be offset from the channel interior surface 122 by a raised border 130 or can extend into the channel interior surface 122 forming a recessed portion. The raised border 130 extends outward (e.g., forward) from the channel interior surface 122 and typically surrounds the pocket 126. Accordingly, a rear pocket surface 134 may be substantially coplanar with the channel interior surface 122. Alternatively, the rear pocket surface 134 may be setback from the channel interior surface 122. Typically, the pocket 126 has a substantially rectangular shape, however, it is contemplated that the pocket 126 may be any shape based on the configuration of the microphone assembly 38.

The rear pocket surface 134 defines locating protrusions 138 extending outward towards a front 142 of the laundry appliance 10. The specific configuration may vary based on the configuration of the microphone assembly 38 and/or the laundry appliance 10. For example, in the illustrated example of FIG. 4, the pocket 126 includes two locating protrusions 138. However, more or fewer locating protrusions 138 may be included without departing from the teachings herein. The number of locating protrusions 138 is often based on the size and/or shape of the microphone assembly 38 and/or the door 18. The locating protrusions 138 may be substantially cylindrical or frusto-conical or any other practicable shape. The locating protrusions 138 are illustrated in FIG. 4 as extending a substantially same distance from the rear pocket surface 134. Alternatively, the locating protrusions 138 may extend different distances from the rear pocket surface 134.

Further, the configuration may depend on the configuration of the mating components. In a specific configuration, the locating protrusions 138, as illustrated, are positioned substantially the same distance from opposing lateral sides of the pocket 126, respectively. Additionally, the locating protrusions 138 are positioned along a horizontal midpoint of the pocket 126. In other words, the locating protrusions 138 are positioned substantially equidistant from upper and lower sides of the pocket 126. These configurations and locations of the protrusions 138 are contemplated. Accordingly, the positioning of the locating protrusion 138 is generally dependent on the location of corresponding locating channels 160 defined in a locating gasket 162 of the microphone assembly 38 that are configured to receive the locating protrusions 138. The locations of the locating protrusion 138 and the locating channels 160 can vary depending on the design of the device and locations of various components.

Figure 5:
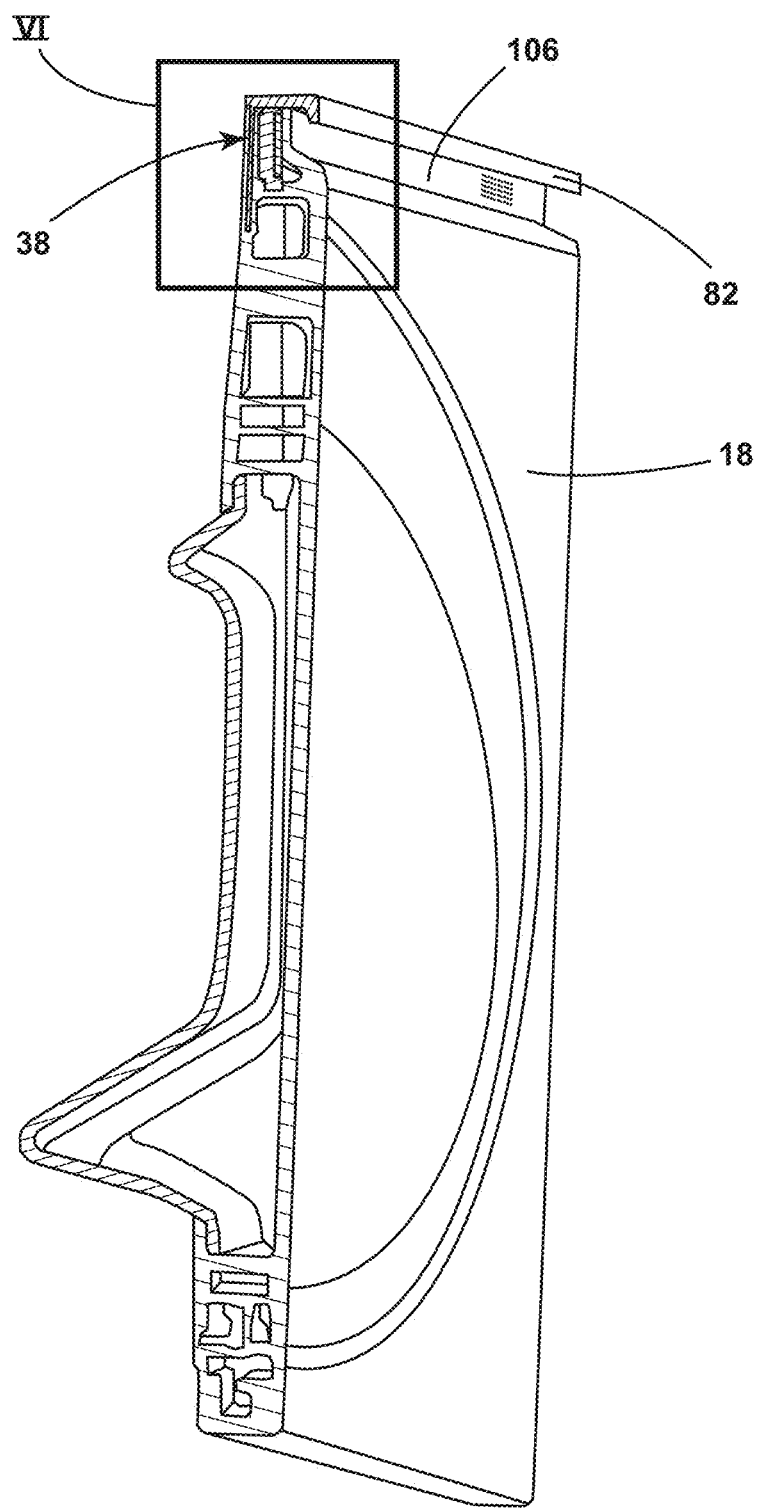
FIG. 5 is a cross-sectional view of the door of FIG. 3 taken along line VII-VII, according to at least one example.
Figure 6:
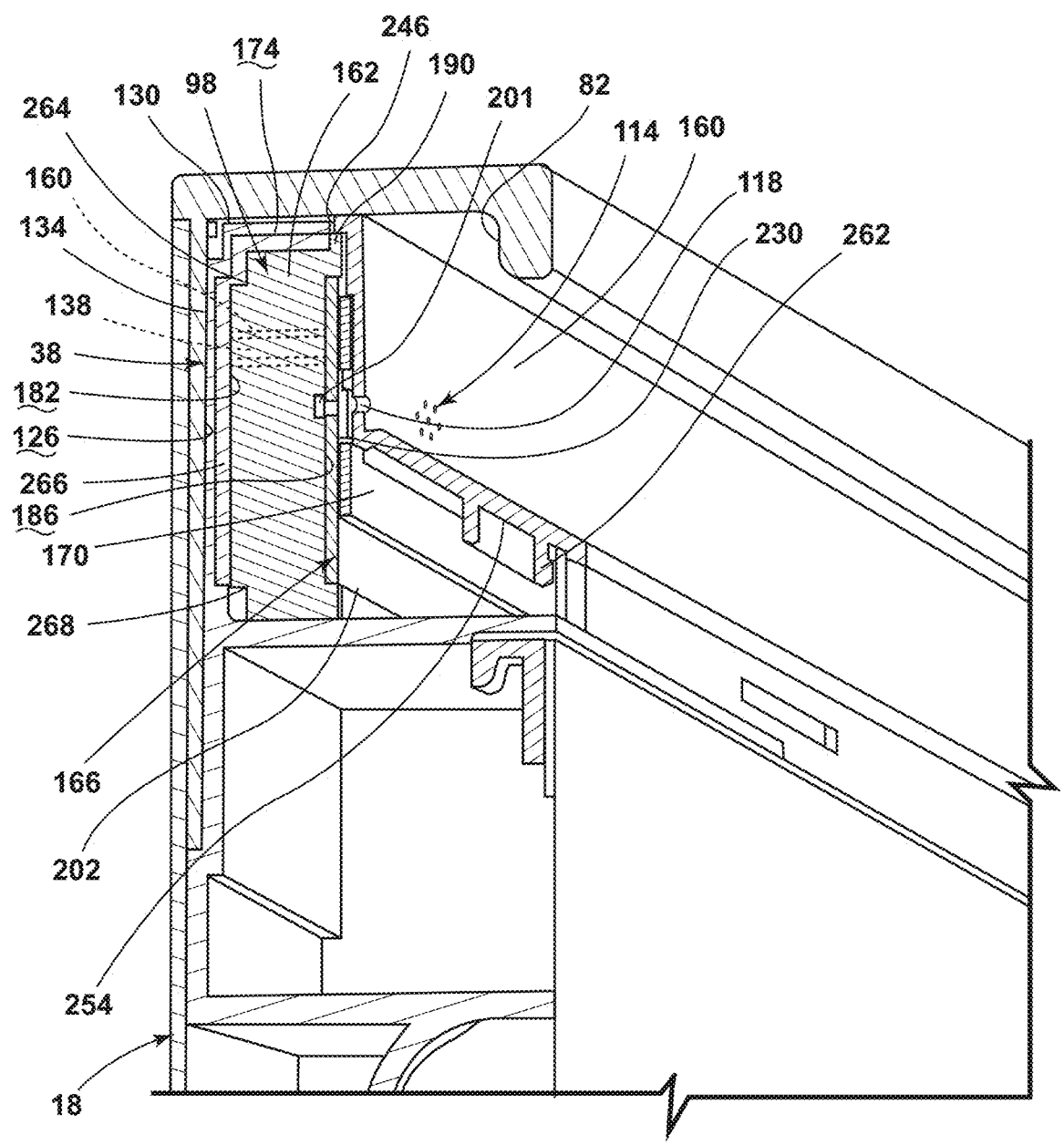
FIG. 6 is an enlarged cross-sectional view of FIG. 7, taken at area VIII.

Referring still to FIGS. 4-6, the audio interface 34 of the laundry appliance 10 includes the microphone assembly 38 for receiving a user input via voice commands and the speaker 102 (FIG. 1) for projecting an audio output to the user. The microphone assembly 38 includes the locating gasket 162 and a microphone printed circuit board (MPCB) assembly 166 including at least one microphone 206. The MPCB assembly 166 is coupled to the locating gasket 162. Additionally, the microphone assembly 38 includes an acoustic layer 170 coupled to the MPCB assembly 166 on an opposing side relative to the locating gasket 162.

Referring again to FIGS. 1 and 4-6, the locating gasket 162 is configured to be positioned within the pocket 126 of the handle 82 defined by the channel interior surface 122 when the handle 82 is assembled. The locating gasket 162 can have a variety of configurations. The locating gasket 162, as illustrated in FIG. 4, has a substantially rectangular shape. However, the locating gasket 162 may have any shape that substantially corresponds with the shape of the pocket 126 to produce a form-fitting connection. The configuration of the locating gasket 162 can vary based on the configuration of the device. For example, outer surfaces 174 of the locating gasket 162 abut the raised border 130 that defines the pocket 126. The border can be continuous or can include interruptions and gaps in the structure that surrounds and defines the pocket 126. The outer surfaces 174 of the locating gasket 162 can directly abut the channel interior surface 122 that defines the pocket 126. The locating gasket 162 is configured to substantially fill the pocket 126. In such examples, there is typically not a gap between the locating gasket 162 and the rear pocket surface 134. Accordingly, the pocket 126 and the locating gasket 162 may have substantially similar depths. However, it is contemplated that the locating gasket 162 may have a greater depth compared to the pocket 126 to engage the cover member 106 without departing from the teachings herein.

The locating gasket 162 defines the locating channels 160 configured to align with and receive the locating protrusions 138. When assembled, the locating protrusions 138 extend into and/or through the locating channels 160. The engagement between the locating protrusions 138 and the locating channels 160 is advantageous for providing proper alignment between the pocket 126 and the locating gasket 162. Accordingly, the number of locating channels 160 typically corresponds with the number of locating protrusions 138.

In a non-limiting example, the locating channels 160 extend through the entire depth of the locating gasket 162. In other words, the locating channels 160 extend from an inward surface 182 of the locating gasket 162 to an outward surface 186 of the locating gasket 162. In such examples, the locating protrusions 138 can extend all or part of a length of the locating channels 160, respectively. In another non-limiting example, the locating channels 160 extend a portion of the depth of the locating gasket 162. In such examples, the length of the locating channels 160 can align with the length of the locating protrusions 138, respectively. The size and/or shape of the locating channels 160 is typically determined by the size and/or shape of the locating protrusions 138 to produce a form-fitting connection that minimizes unwanted noise and vibration.

The locating gasket 162 includes locating projections 180 extending from the outward surface 186 of the locating gasket 162. The locating projections 180 may each define an end opening 188 of the locating channels 160, respectively, in exemplary embodiments where the locating channels 160 extend between the inward and outward surfaces 182, 186 of the locating gasket 162. It is contemplated that the locating projections 180 may define a solid surface and may not define the openings to the locating channels 160, respectively. In such an embodiment, the locating projections 180 may act as a stop for positioning the alignment protrusions within the locating gasket 162. The locating projections 180 are advantageous for providing proper alignment between the MPCB assembly 166 and the locating gasket 162.

Referring still to FIGS. 1 and 4-6, the locating gasket 162 includes a rim 190 extending along a perimeter thereof to position various components of the microphone assembly 38. The rim 190 may extend around the entire perimeter, or alternatively, the rim 190 may extend around a portion of the perimeter. For example, the rim 190 may be configured as segments that extend around corners 194 of the locating gasket 162. The rim 190 and the locating projections 180 can have varying configurations based on the configuration of the device and arrangement of various components. For example, the rim 190 and the locating projections 180 typically extend a substantially similar distance from the outer surface 94 of the locating gasket 162. Alternatively, either the locating projections 180 or the rim 190 may extend a greater distance. The configuration of the rim 190 and the locating projections 180 vary based on the configuration of the pocket 126 and the door 18 of the laundry appliance 10. An upper surface 192 of the rim 190 may extend past the raised border 130 defining the pocket 126.

The locating gasket 162 typically is vibration resistant, absorbs vibrations, and/or reduces vibrations. The locating gasket 162 includes elastomeric materials, such as, for example, silicone or rubber. The locating gasket 162 reduces vibrations within the microphone assembly 38. Additionally or alternatively, the locating gasket 162 is advantageous for isolating noise and/or vibrations of the laundry appliance 10 (e.g., caused by operation of the laundry appliance 10) from the microphone assembly 38. Isolating the microphone assembly 38 via the locating gasket 162 is advantageous for increasing the quality of the audio interface 34. Further, the locating gasket 162 is advantageous for increasing the reliability of the voice and/or input recognition given through voice commands through the isolation of the microphone assembly 38.

Referring still to FIGS. 4 and 6, in various examples, the MPCB assembly 166 is coupled to the locating gasket 162. The rim 190 of the locating gasket 162 defines a space 198 that substantially corresponds with the size and shape of the MPCB assembly 166. The upper surface 192 of the rim 190 is often coplanar with the MPCB assembly 166 when the MPCB assembly 166 is coupled to the locating gasket 162. The MPCB assembly 166 includes a printed circuit board (PCB) 202 and at least one microphone 206 disposed thereon. The PCB 202 includes a control having control circuitry with microphone drive circuitry for controlling activation and deactivation of the microphone 206. Additionally or alternatively, the PCB 202 includes sensor drive circuitry for controlling activation and deactivation of a proximity sensor 210 positioned on or coupled with the PCB 202. The PCB 202 may be any type of circuit board including, but not limited to, any flexible PCB and/or rigid PCB.

The MPCB assembly 166 defines holes 214 configured to align with the locating projections 180 of the locating gasket 162. At least one of the rim 190 and the locating projections 180 operate to align with the MPCB assembly 166 within the locating gasket 162. Proper alignment of the MPCB assembly 166 is advantageous for maximizing the reliability of the audio interface 34. In other words, proper alignment is advantageous for reducing interference between the microphone 206 and the voice command given by the user. The locating projections 180 extend into and/or through the holes 214 of the MPCB assembly 166.

The MPCB assembly 166 can have a variety of configurations based on the configuration of the laundry appliance 10. As illustrated in FIG. 4, the MPCB assembly 166 typically includes four microphones 206A-206D, collectively referred to as microphones 206. The microphones 206 are configured to receive a voice command from a user. More or fewer microphones 206 may be included without departing from the teachings herein. In a specific example, one of the microphones 206 is positioned on each opposing side of one of the holes 214 defined by the MPCB assembly 166 (e.g., the microphones 206A, 206B on opposing sides of one hole 214). Other configurations of the microphones 206 on the MPCB assembly 166 are contemplated and may be advantageous based on the configuration of the microphone assembly 38 and the door 18.

Referring again to FIGS. 1, 4, and 6, the proximity sensor 210 is coupled to the MPCB assembly 166. The proximity sensor 210 is disposed among the microphones 206, and typically disposed in a center portion 216 of the MPCB assembly 166 with the microphones 206B, 206C positioned adjacent to each lateral side of the proximity sensor 210. The proximity sensor 210 defines a sensor field 218 extending outwardly (e.g., generally forward) from the front 142 of the laundry appliance 10. Accordingly, the proximity sensor 210 is configured to sense when a user is approaching the front 142 of the laundry appliance 10. The proximity sensor 210 and/or an associated controller may include a temporal component, which is advantageous for differentiating between a user approaching the front 142 of the laundry appliance 10 to give a voice command and a person walking past the front 142 of the laundry appliance 10. Proper alignment of the MPCB assembly 166 within the locating gasket 162 and the locating gasket 162 within the pocket 126 is also advantageous for preventing interference with the sensor field 218 due to misalignment.

Referring still to FIGS. 4 and 6, the microphone assembly 38 includes the acoustic layer 170 coupled to the MPCB assembly 166. The acoustic layer 170 typically includes foam materials or other vibration resistant and/or absorbent materials that minimize unwanted noise and vibration. Additionally, the acoustic layer 170 often includes materials that are resiliently and elastically compressible. The acoustic layer 170 is advantageous for isolating the MPCB assembly 166 from vibrations that may affect the reliability of the audio interface 34. The configuration of the acoustic layer 170 can vary based on the configuration of the device. For example, the acoustic layer 170, has a height that is less than a height of the MPCB assembly 166. However, it is contemplated that the acoustic layer 170 can have a substantially similar height or a greater height based on the configuration of the microphone assembly 38 and the door 18. The acoustic layer 170 can be offset and spaced-apart from the upper surface 192 of the rim 190 of the locating gasket 162, or alternatively, positioned and/or retained by the rim 190 of the locating gasket 162. Accordingly, the acoustic layer 170 may be coplanar with the upper surface 192 of the rim 190.

The acoustic layer 170 defines locating port apertures 222, microphone port apertures 226, and a sensor port aperture 230. The locating port apertures 222 are configured to align with the locating projections 180 of the locating gasket 162. In such examples, the locating projections 180 extend through the MPCB assembly 166 and into and/or through the locating port apertures 222 of the acoustic layer 170. Further, the number, size, and/or shape of the locating port apertures 222 depend on the number, size, and shape of the locating projections 180. The shape and/or size of the locating port apertures 222 can be substantially the same as the shape and/or size of the microphone port apertures 226.

The microphone port apertures 226 are illustrated as having a substantially circular or oblong shape; however, the microphone port apertures 226 may also have a substantially square, rectangular, or another polygonal shape. The microphone port apertures 226 can vary the reliability and accuracy of the microphones 206. Typically, the microphone port apertures 226 have the same shape through the entire assembly. Specifically, the microphone port apertures 226 extend through the acoustic layer 170 and have the same shape, diameter, and/or width through the length of the microphone port apertures 226, respectively. In other words, the shape, diameter, and/or width of each microphone port aperture 226 is the same at a first surface 234 of the acoustic layer 170, at a second surface 236 of the acoustic layer 170, and at each point therebetween (e.g., through the entire depth of the acoustic layer 170). The consistent diameter and/or width is advantageous for reducing an echo that can be produced by sound waves from a voice command traveling through the microphone port aperture 226. A change in the shape, diameter, and/or width of the microphone port apertures 226 typically alters a direction of the sound waves of the voice command and produces an echo or other undesirable sound interference, which reduces the reliability of the audio interface 34. As such, each of the microphone port apertures 226 is substantially the same to increase the reliability of each of the microphones 206, respectively.

Referring still to FIGS. 1, 4, and 6, the acoustic layer 170 defines the sensor port aperture 230. The proximity sensor 210 positioned on the MPCB assembly 166 aligns with and extends into and/or through the sensor port aperture 230. As illustrated in FIG. 4, the sensor port aperture 230 has a substantially square and/or rectangular shape. The shape and size of the sensor port aperture 230 is defined by the shape and/or size of the proximity sensor 210. The acoustic layer 170 is advantageous for properly positioning the proximity sensor 210. Additionally or alternatively, the acoustic layer 170 is advantageous for maximizing the sensor field 218 of the proximity sensor 210.

The microphone assembly 38 is enclosed and compressed within the elongated channel 98 between the cover member 106 and the door 18. The cover member 106 often abuts the acoustic layer 170. The cover member 106 typically includes a plastic material and may include the same material as the door 18 of the laundry appliance 10. In various examples, the cover member 106 is an injection molded component. The cover member 106 extends from the left side edge 86 to the right side edge 90 of the door 18. The cover member 106 includes a flange 238 that extends over an upper pocket surface 242. The flange 238 defines a cutout 246 configured to align with the pocket 126 defined by the rear pocket surface 134. The upper pocket surface 242 and/or the raised border 130 is typically offset from a surrounding upper surface and is configured to form an interlocking connection with the flange 238 when positioned within the cutout 246.

The cover member 106 includes a first wall 250 and a second wall 254. The first wall 250 may be substantially vertical and configured to be positioned adjacent to the acoustic layer 170 when the door 18 is assembled. The second wall 254 typically extends forward from the first wall 250. As exemplified in FIG. 6, the second wall 254 extends at an angle in a range of from about 30° to about 60° from a bottom 258 of the first wall 250. The second wall 254 extends towards the front 142 of the laundry appliance 10 and away from the microphone assembly 38 and is configured to couple to the outer surface 94 of the door 18. The first and second walls 250, 254 form an area of the handle 82 available for grasping.

Figure 7:
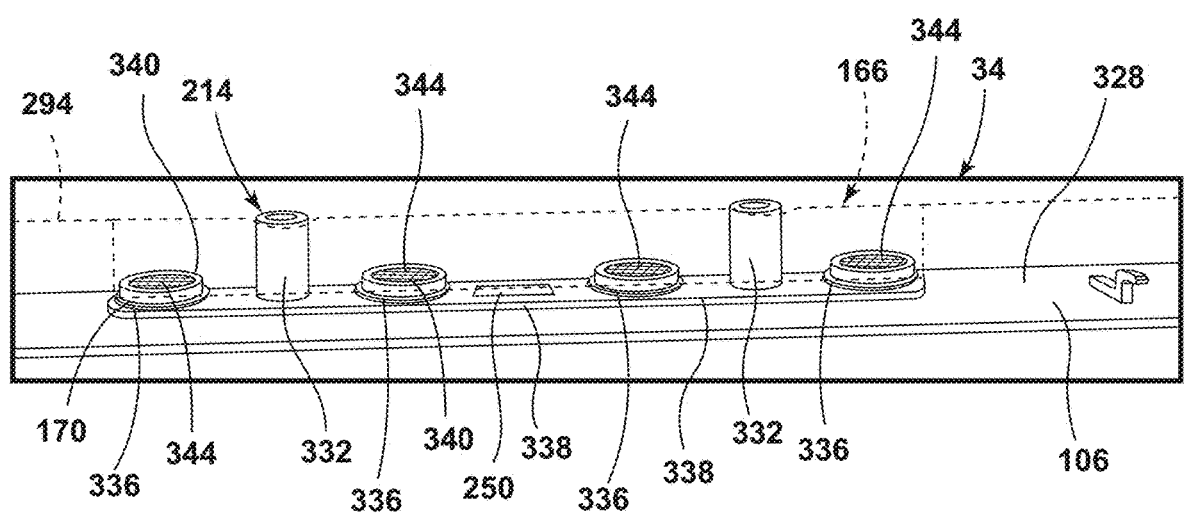
FIG. 7 is a partial interior bottom view of a microphone assembly of the door, according to at least one example.

It is contemplated that the audio interface 34 may have different configurations, as illustrated in FIG. 7. Referring to FIGS. 1, 4, and 7, the MPCB assembly 166 can contact the cover member 106 and the channel interior surface 122 directly. A back surface 328 of the cover member 106 defines mounting bosses 332 extending outward towards the rear pocket surface 134 when the door 18 is assembled. The holes 214 defined by the MPCB assembly 166 correspond with and align with the mounting bosses 332 of the cover member 106. Accordingly, the MPCB assembly 166 defines at least a sufficient number of holes 214 to accommodate the mounting bosses 332. The mounting bosses 332 are advantageous for positioning the MPCB assembly 166 to maximize soundwaves reaching the microphones 206.

The back surface 328 of the cover member 106 may define raised ribs or supports 336. The raised supports 336 may define patterns on the back surface 328 of the cover member 106 that corresponds to the configuration of the microphone assembly 38. As illustrated in FIG. 7, the raised supports 336 can define four circles spaced-apart within an oblong raised support 338. The four circular raised supports 336 correspond with the microphone apertures 114 defined by the cover member 106. Further, each of the circular raised supports 336 may be configured to correspond with one microphone 206 of the MPCB assembly 166. Further, the oblong raised support 338 may correspond with a length of the MPCB assembly 166. In various examples, the acoustic layer 170 may include gaskets 340 each configured to align with one microphone 206 and the corresponding microphone aperture 114, respectively. Accordingly, each of the gaskets 340 may be positioned within or otherwise coupled with the circular raised supports 336. The gaskets 340 may be advantageous for providing a seal around the microphones 206 to focus the sound waves into the microphones. An additional gasket 340 can be included around the proximity sensor 210 and the corresponding sensor port aperture 118.

In various examples, an acoustic mesh layer 344 may be disposed on or otherwise coupled with each of the gaskets 340, respectively. The acoustic mesh layer 344 partially or entirely extends across the gaskets 340. The acoustic mesh layer 344 is advantageous for providing ingress protection between the microphone apertures 114 and the microphones 206. Additionally, the acoustic mesh layer 344 can minimally and/or not interfere with soundwaves traveling to the microphones 206. The MPCB assembly 166 typically abuts the gaskets 340 when assembled with the mounting bosses 332 of the cover member 106.

Referring to FIGS. 4 and 7, when assembled, the device can have a variety of configurations. As illustrated in FIG. 4, the locating gasket 162 can be disposed in the pocket 126. In another example, as illustrated in FIG. 5, an opposing side of the MPCB assembly 166 abuts the rear pocket surface 134 of the pocket 126. Alternatively, in examples without the pocket 126, the MPCB assembly 166 abuts the channel interior surface 122 of the elongated channel 98. In other words, the microphone assembly 38 may not include the locating gasket 162 but can include another elastomeric member. The gaskets 340 take the place of the locating gasket 162. It is contemplated that the channel interior surface 122 can be substantially flat or include ribs or other surface features. The ribs or other surface features assist in retaining the MPCB assembly 166 in proper alignment. The MPCB assembly 166 is compressed between the gaskets 340 and the channel interior surface 122. When compressed therebetween, the MPCB assembly 166 compresses the gaskets 340 to abut the raised supports 336 defined by the back surface 328 of the cover member 106. The exemplary embodiments of the audio interface 34, illustrated in FIGS. 4 and 7, are both configured to reduce interference with the microphone assembly 38 (e.g., from vibrations from the laundry appliance 10) and increasing reliability of the audio interface 34 by reducing interference with sound waves traveling to the microphones 206.

Figure 8:
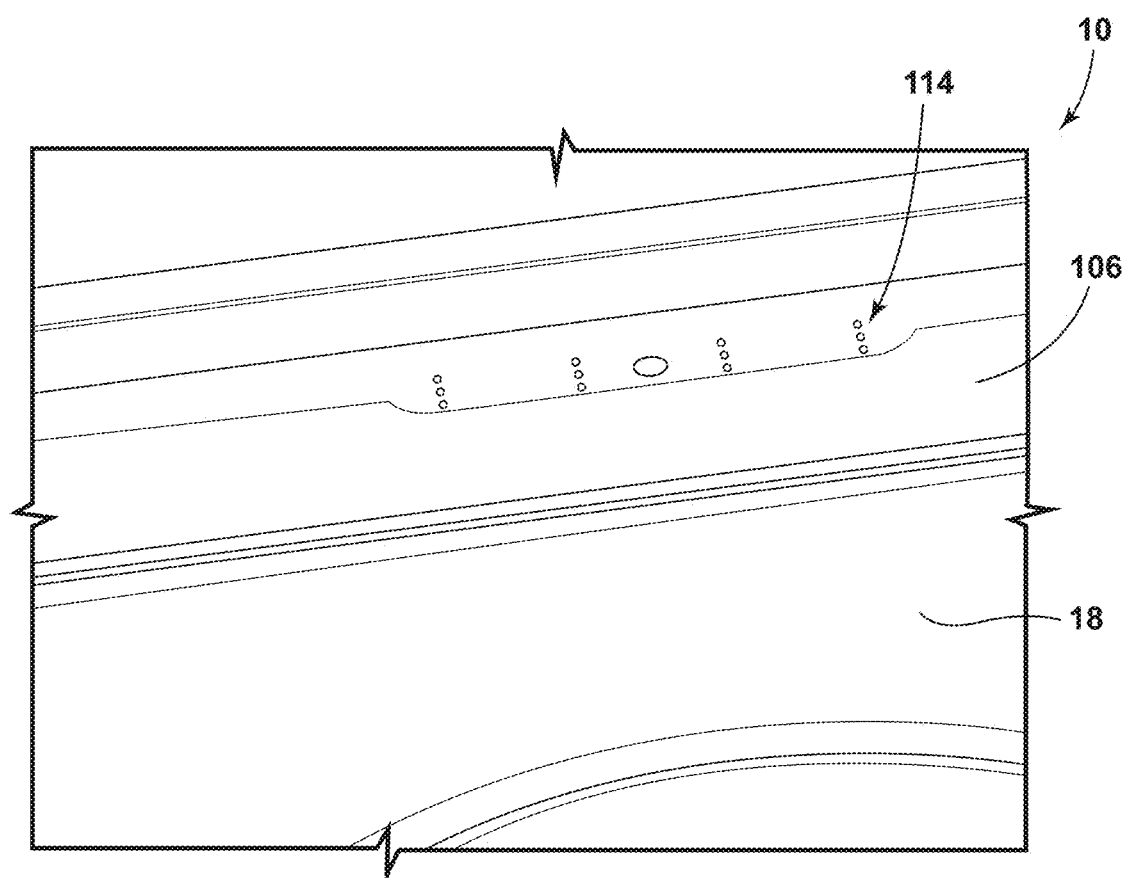
FIG. 8 is an enlarged partial perspective view of a cover member defining microphone apertures, according to at least one example.

Referring to FIGS. 4 and 8, the microphone apertures 114 defined by the cover member 106 may be configured in a variety of ways. As illustrated, the microphone apertures 114 are arranged in groupings of microphone apertures 114. The groupings of microphone apertures 114 are advantageous to direct the sound waves of the voice command to the microphone port apertures 226, respectively. Each of the groupings of microphone apertures 114 aligns with a single microphone port aperture 226 of the acoustic layer 170 to direct the voice command to the corresponding microphone 206. The alignment of the respective microphone apertures 114 and the microphone port aperture 226 increases the reliability and accuracy of the microphones 206. As illustrated, the groupings of microphone apertures 114 are arranged in vertically stacked configurations. The illustrated configuration may provide for proper spacing of the microphones 206. Specific spacing of the microphones 206 in the illustrated array may be advantageous for more clearly receiving voice commands and more effectively filtering directional sound and noise.

In certain aspects, the microphones 206 may be arranged at predefined distances relative to one another in the array. Software (e.g., algorithms) within the microcontroller 42 or another associated controller can use the position and spacing of the microphones 206, as well as a time difference for the arrival of sound to each microphone 206 to calculate a location of the source of the sound. This pairing between the positioning of the microphones 206 and the software allows the software to identify the speaker of a voice command and distinguish the sound from the speaker from other sounds from a different calculated position. The relative location of the microphones 206 affects when each microphone 206 receives sound waves, and therefore effects the calculation for determining the location of the source of the sound.

The illustrated configuration of the microphone apertures 114 in the vertically stacked configuration is merely exemplary. The vertically stacked configuration provided for a chamber to reduce microphone position tolerance in the illustrated example. However, the configuration can be changed to any practicable positioning of the microphones 206 and arrangement of the microphone apertures 114 based on the pairing with different software.

Referring to FIGS. 4-6, the microphone assembly 38 is compressed between the door 18 and the cover member 106. The acoustic layer 170 allows the microphone assembly 38 to be compressed between the door 18 and the cover member 106 with minimal interference in the operation of the microphone assembly 38. The positioning of the microphone assembly 38 increases the reliability of the audio interface 34. In such examples, the positioning can increase the reliability of the microphone 206 detecting specified commands from various distances.

The microphone assembly 38 is positioned proximate the handle 82 behind the cover member 106. The cover member 106 includes ribs 262 extending from the second wall 254 for increased structural strength of the cover member 106. The increased strength is advantageous as the cover member 106 defines the handle 82 of the door 18, which is grabbed and pulled by the user to move the door 18 to the opened position. The locating gasket 162 can define upper and lower notches 264, 268 for positioning the locating gasket 162 within the pocket 126. Additionally or alternatively, the microphone assembly 38 may include a padded layer 266. The padded layer 266 typically includes similar materials to the locating gasket 162 and/or the acoustic layer 170. The padded layer 266 is positioned between the locating gasket 162 and the rear pocket surface 134. The padded layer 266 provides additional vibration absorption and/or vibration resistance for isolating the microphone assembly 38 from vibrations.

Referring to FIGS. 1-8, each of the components of the microphone assembly 38 may be adhered together. For example, the MPCB assembly 166 is adhered to the locating gasket 162, the acoustic layer 170 is adhered to the MPCB assembly 166, and the locating gasket 162 is adhered within the pocket 126. The cover member 106 may then be adhered over the microphone assembly 38. Other methods of coupling and/or attaching the microphone assembly 38 and the cover member 106 are also contemplated without departing from the teachings herein.

Figure 9:
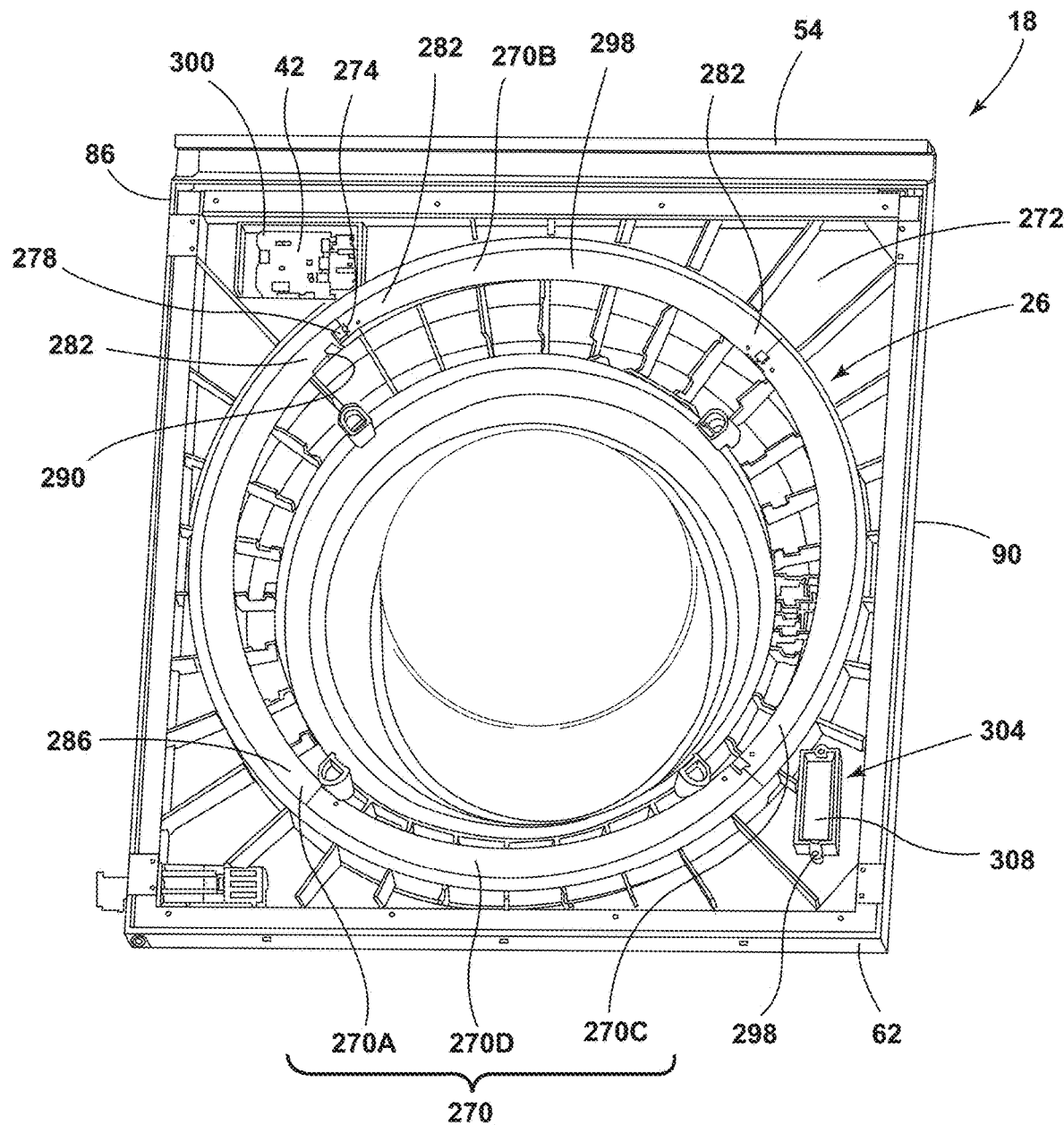
FIG. 9 is a perspective view of a rear surface of the door of FIG. 3, with the inner panel removed, according to at least one example.
Figure 10:
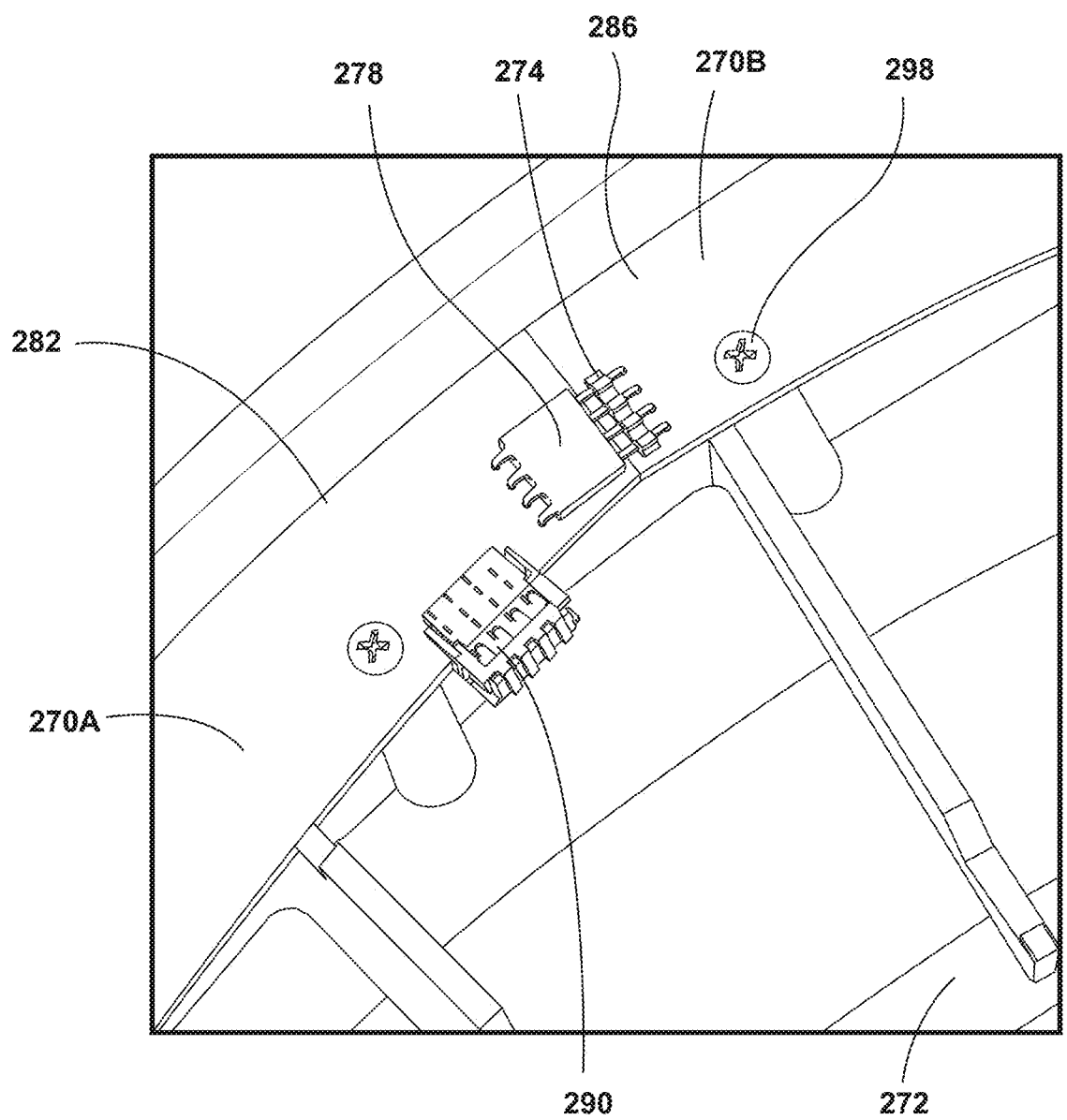
FIG. 10 is an enlarged partial interior perspective view of a visual interface coupled to the door, according to at least one example.

Referring to FIGS. 1, 9, and 10, the laundry appliance 10 includes the visual interface 26 for conveying messages to the user. The visual interface 26 defines the light ring 30 on the outer surface 94 of the door 18. While illustrated as a light ring 30, the visual interface 26 may define any shape, plurality of shapes, or other animation without departing from the teachings herein. Typically, the visual interface 26 is coupled to an inner surface 272 of the door 18 and configured to display messages on the outer surface 94 of the door 18. The visual interface 26 includes at least one light printed circuit board (LPCB) assembly 270. The LPCB assembly 270 includes light drive circuitry for controlling activation and deactivation of the light ring 30. The visual interface 26 can have a variety of configurations for displaying messages. As illustrated in FIG. 9, the visual interface 26 includes four LPCB assemblies 270A-270D, collectively referred to as the LPCB assemblies 270. In certain aspects of the device, each of the LPCB assemblies 270 is shaped as a quarter-circle. Accordingly, the four LPCB assemblies 270 are coupled together to form a substantially circular or oblong light ring 30.

The LPCB assemblies 270 are coupled together via male and female pin connections 274, 278. In various examples, a first end 282 of each of the LPCB assemblies 270 includes the female pin connection 278 and a second opposing end 286 includes the male pin connection 274. At least one of the LPCB assemblies 270 is operably and/or electrically coupled to the microcontroller 42 via a connector 290. Accordingly, the LPCB assembly 270A coupled to the microcontroller 42 is activated and deactivated by the microcontroller 42, and the other LPCB assemblies 270B-270D are activated and deactivated, respectively, through the male and female pin connections 274, 278. In other words, the microcontroller 42 can selectively activate (e.g., illuminate) each of the LPCB assemblies 270.

In various examples, each of the LPCB assemblies 270 is mechanically fastened to the inner surface 272 of the door 18 surrounding the deflector 70. Accordingly, the LPCB assemblies 270 may be coupled to the inner surface 272 via fasteners 298, such as, for example, pins, screws, bolts, or other similar coupling members. As illustrated in FIG. 9, each LPCB assembly 270 is coupled to the interior surface via three fasteners 298, however, more or fewer fasteners 298 may be used without departing from the teachings herein.

Referring to FIGS. 1 and 9, the outer surface 94 of the door 18 is positioned over the LPCB assemblies 270 to provide for the visual interface 26. In various examples, the outer surface 94 may be a transparent or translucent material such as, for example, acrylic, plastic, glass, tinted glass, and/or a combination thereof. It is contemplated that the outer surface 94 can include a tinted material with a nontinted portion configured to align with the LPCB assemblies 270 to form the light ring 30. Such a configuration is advantageous to increase the brightness of the light ring 30.

Figure 11:
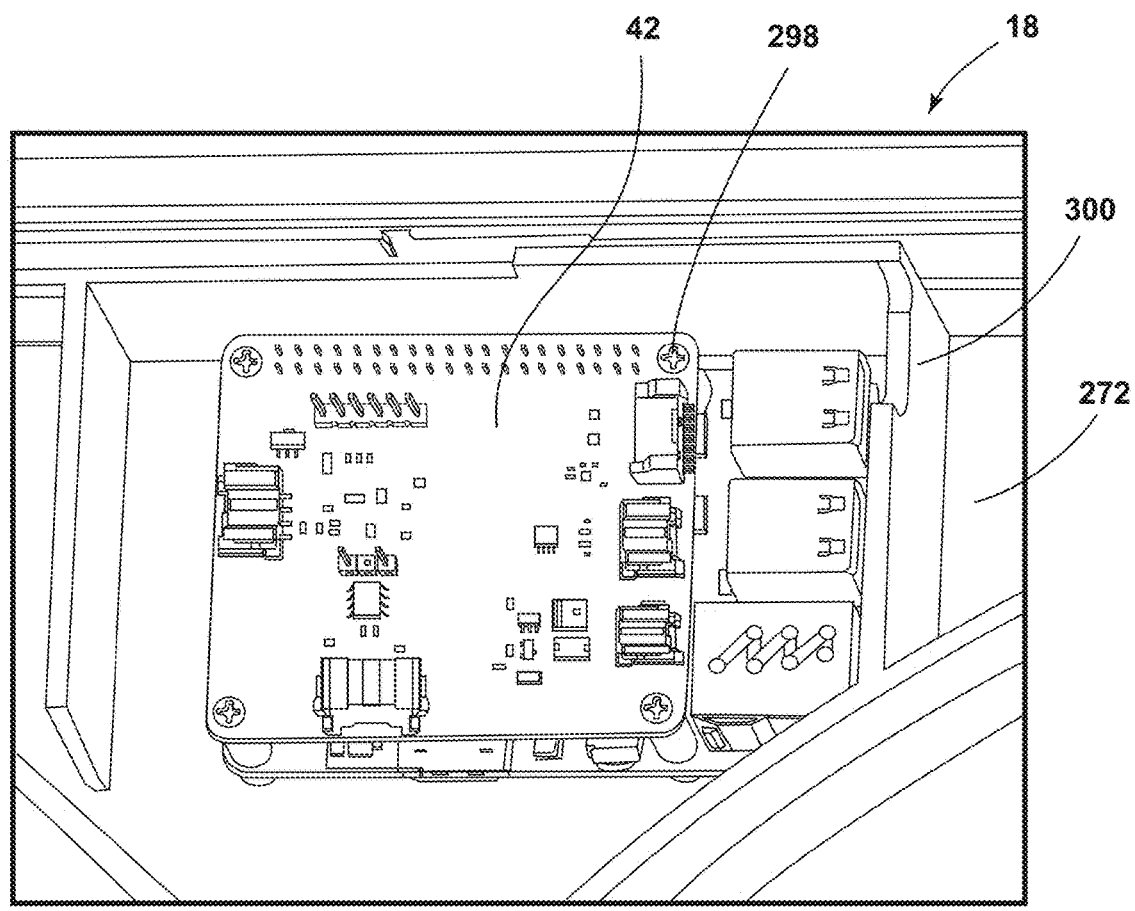
FIG. 11 is an enlarged partial perspective view of the microcontroller for the door, according to at least one example.

Referring to FIGS. 1, 9, and 11, the microcontroller 42 is coupled to the inner surface 272 of the door 18 within an enclosure 300. Accordingly, the microcontroller 42 is typically set back from the surrounding inner surface 272 of the door 18. The enclosure 300 is advantageous for reducing and/or limiting exposure of the microcontroller 42 to heat and moisture produced by the laundry appliance 10 and/or an external environment. The microcontroller 42 can be positioned proximate to the left side edge 86 and the top edge 54 of the door 18 but may be positioned elsewhere in the door 18. The microcontroller 42 may be configured as a "Raspberry Pi®" or other configurations of single-board computers. The microcontroller 42 is mechanically fastened to the inner surface 272 of the door 18 via the fasteners 298. As illustrated in FIG. 11, the microcontroller 42 is coupled to the door 18 via four fasteners 298.

Referring still to FIGS. 1, 4, and 9, the microcontroller 42 is operably coupled to the audio interface 34 and the visual interface 26. Accordingly, the microcontroller 42 is operably coupled to the speakers 102, the MPCB assembly 166, and the LPCB assemblies 270, such that the visual and audio interfaces 26, 34 can operate together and separately. The microcontroller 42 is configured to activate the microphone assembly 38 in response to sensed information received from the proximity sensor 210. The microcontroller 42 can then send a corresponding signal to the speakers 102 to provide an audio output and/or a corresponding signal to the visual interface 26 to provide a visual message to the user. The LPCB assemblies 270 can be selectively activated in response to the voice command.

Additionally or alternatively, a door opening assembly 304 may be coupled to the door 18. The door opening assembly 304 includes a motor 308, which is illustrated adjacent to the right side edge 90 and the bottom edge 62 of the door 18. The motor 308 is illustrated as being mechanically fastened to the inner surface 272 of the door 18 via two fasteners 298. Alternatively, the door opening assembly 304 may be positioned elsewhere on the door 18. The door opening assembly 304 is operably coupled to the microcontroller 42. When a user gives a specified voice command to open the door 18, the MPCB assembly 166 sends a signal to the microcontroller 42, which then sends a corresponding signal to the door opening assembly 304. Accordingly, the door 18 of the laundry appliance 10 can be opened via voice commands. The door opening assembly 304 positioned on the door 18 is advantageous for separating the door opening assembly 304 from a higher-voltage door lock assembly coupled to the cabinet 14.

Figure 12:
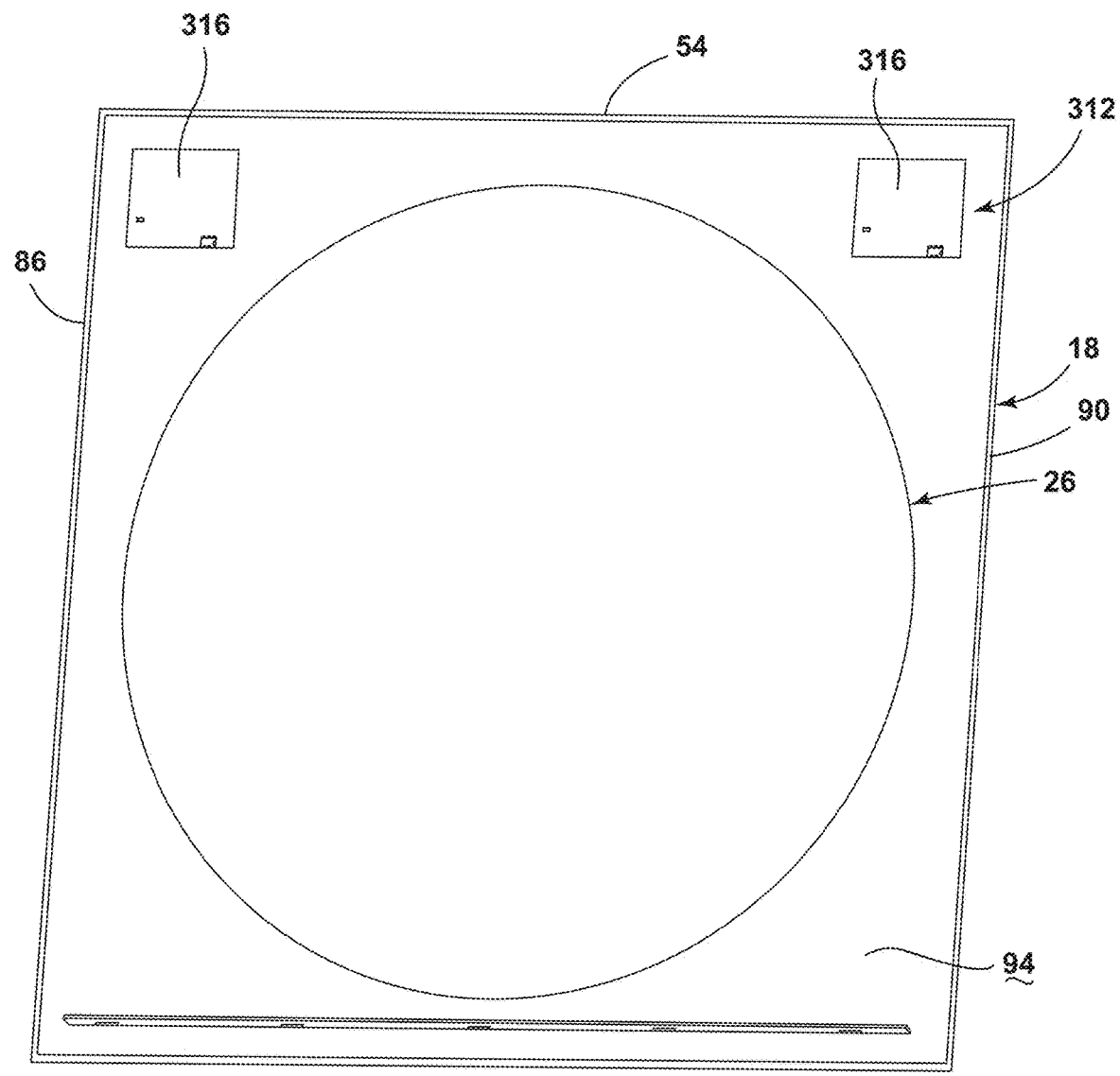
FIG. 12 is a front perspective view of the door including a tactile interface, according to at least one example.

Referring to FIGS. 1 and 12, the user-interface system 22 includes a tactile interface 312. The tactile interface 312 includes at least one touch printed circuit board (TPCB) assembly 316. As illustrated in FIG. 12, the tactile interface 312 includes two TPCB assemblies 316 positioned adjacent to the left and right side edges 86, 90 and the top edge 54 of the door 18, respectively. The TPCB assemblies 316 are typically accessible via the outer surface 94 of the door 18. In various examples, the TPCB assemblies 316 are coupled directly to the glass outer surface 94 of the door 18. The TPCB assemblies 316 can provide for a capacitive touch response. The TPCB assemblies 316 correspond with a power button 320 and a start button 324 on the outer surface 94 of the door 18.

Use of the present disclosure provides for a variety of advantages. For example, the microphone assembly 38 provides increased quality to the audio interface 34. Further, the microphone assembly 38, including the locating gasket 162 and the acoustic layer 170, isolate the PCB 202 and the microphones 206 from vibrations that can interfere with the audio interface 34. Additionally, the microphone assembly 38 can increase the reliability of voice command recognition due to the positioning of the components of the microphone assembly 38. Also, the microphone assembly 38 can recognize a voice command from a greater distance. Further, the geometries of the microphone port apertures 226 of the acoustic layer 170 typically reduce an echo produced by the voice command. Moreover, the addition of the acoustic layer 170 allows the microphone assembly 38 to be compressed into the handle 82 of the door 18 with minimal interference in the microphone assembly 38 operation. Further, the user-interface system 22 provides a combined system including the audio interface 34, the visual interface 26, and the tactile interface 312. Additionally, the user-interface system 22 is advantageously positioned within the door 18 of the laundry appliance 10. Additional benefits and advantages of using this device may also be realized and/or achieved.

The device disclosed herein is further summarized in the following paragraphs and is further characterized by combinations of any and all of the various aspects described therein.

According to an aspect of the present disclosure, a laundry appliance includes a cabinet. A door is coupled to the cabinet. The door is operable between a closed position and an opened position. A microphone assembly is coupled to the door. The microphone assembly is configured to receive a voice command. A microcontroller is coupled to the door. The microcontroller is operably coupled to the microphone assembly and the microcontroller. A proximity sensor is coupled to the microphone assembly. The proximity sensor defines a sensor field that extends outward from the door.

According to another aspect, a microphone assembly includes a printed circuit board assembly that has a plurality of microphones disposed thereon.

According to another aspect, a microphone assembly includes a locating gasket and an acoustic layer. A printed circuit board assembly is disposed between the locating gasket and the acoustic layer.

According to another aspect, a cover member is coupled to the door. The microphone assembly is compressed between a cover member and a back panel of a door.

According to another aspect, a cover member defines a microphone aperture that is configured to align with a microphone of a microphone assembly.

According to another aspect, a door defines an elongated channel proximate a handle. A microphone assembly is disposed in auditory communication with the handle.

According to another aspect, a proximity sensor is in communication with a microcontroller. The microcontroller is configured to activate a microphone assembly in response to sensed information received from the proximity sensor.

According to another aspect, a visual interface is coupled to the door and is configured to display a message. The message corresponds with a voice command received by a microphone assembly.

According to another aspect of the present disclosure, an appliance door includes a door panel that has an outer surface and an inner surface. The door panel defines an elongated channel that is configured as a handle. An audio interface is disposed proximate the handle. The audio interface includes a speaker and a microphone printed circuit board assembly that has at least one microphone. A visual interface is coupled to the inner surface of the door. The visual interface is configured to display messages on the outer surface of the door.

According to another aspect, an acoustic layer includes a gasket disposed around a microphone and an acoustic mesh layer that extends over the gasket.

According to another aspect, a microphone printed circuit board assembly is configured to receive a voice command. A visual interface includes a plurality of light printed circuit board assemblies configured to selectively illuminate in response to the voice command.

According to another aspect, a door panel defines a pocket within an elongated channel. The pocket is surrounded by a raised border.

According to another aspect, a cover member is coupled to the door panel. The cover member defines a cutout. A raised border is disposed within the cutout to provide an interlocking connection.

According to another aspect, an acoustic layer is coupled to a microphone printed circuit board assembly. The acoustic layer defines at least one microphone port aperture configured to align with the at least one microphone.

According to another aspect, at least one microphone port aperture is a same size and dimension for an entire depth of an acoustic layer.

According to another aspect of the present disclosure, a door assembly includes a door panel that forms a handle. A printed circuit board is coupled to the door panel proximate the handle. A plurality of microphones is coupled to a printed circuit board. An acoustic layer is coupled to the printed circuit board. Each microphone aligns with a microphone port aperture that is defined by the acoustic layer. A cover member is disposed at least partially within the handle. The cover member is disposed adjacent to the acoustic layer.

According to another aspect, a padded layer is disposed between a locating gasket and a door panel.

According to another aspect, a proximity sensor is coupled to a printed circuit board. The proximity sensor defines a sensor field that extends outwardly from a door panel.

According to another aspect, each microphone port aperture is a same size and dimension for an entire depth of an acoustic layer.

According to another aspect, a tactile interface is coupled to an outer surface of a door panel. The tactile interface is configured to provide for a capacitive touch response.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A laundry appliance, comprising:
   a cabinet;
   a door coupled to the cabinet, wherein the door is operable between a closed position and an opened position;
   a microphone assembly coupled to the door, wherein the microphone assembly is configured to receive a voice command, the microphone assembly including a printed circuit board assembly having a plurality of microphones disposed thereon, a locating gasket, and an acoustic layer, wherein the printed circuit board assembly is disposed between the locating gasket and the acoustic layer;
   a microcontroller coupled to the door, wherein the microcontroller is operably coupled to the microphone assembly; and
   a proximity sensor coupled to the microphone assembly and the microcontroller, wherein the proximity sensor defines a sensor field extending outward from the door.

2. The laundry appliance of claim 1, further comprising:
   a cover member coupled to the door, wherein the microphone assembly is compressed between the cover member and a back panel of the door.

3. The laundry appliance of claim 2, wherein the cover member defines a microphone aperture configured to align with a microphone of the microphone assembly.

4. The laundry appliance of claim 1, wherein the door defines an elongated channel proximate a handle, and wherein the microphone assembly is disposed in auditory communication with the handle.

5. The laundry appliance of claim 1, wherein the proximity sensor is in communication with the microcontroller, and wherein the microcontroller is configured to activate the microphone assembly in response to sensed information received from the proximity sensor.

6. The laundry appliance of claim 1, further comprising:
a visual interface coupled to the door and configured to display a message, wherein the message corresponds with the voice command received by the microphone assembly.

7. The laundry appliance of claim 1, wherein the door includes a speaker proximate a handle.

8. The laundry appliance of claim 1, wherein the door includes a channel interior surface defining a pocket with a rear pocket surface, and wherein the locating gasket is disposed within the pocket.

9. The laundry appliance of claim 8, wherein the rear pocket surface defines locating protrusions extending therefrom, and wherein the locating gasket defines locating channels to receive the locating protrusions.

10. The laundry appliance of claim 1, wherein the printed circuit board is disposed between the locating gasket and the acoustic layer.

11. The laundry appliance of claim 1, wherein the printed circuit board defines holes to receive locating projections of the locating gasket.

12. The laundry appliance of claim 1, wherein the locating gasket is constructed of elastomeric material and the acoustic layer is constructed of foam material.

13. The laundry appliance of claim 1, wherein the acoustic layer defines microphone port apertures configured to align with the plurality of microphones, respectively.

14. The laundry appliance of claim 13, wherein each microphone port aperture has a same width through a length of the respective microphone port aperture.

15. The laundry appliance of claim 1, further comprising:
a cover member coupled to the door and abutting the acoustic layer.

16. The laundry appliance of claim 15, wherein the cover member includes a flange that extends over an upper pocket surface within the door, and wherein the upper pocket surface is configured to be positioned within a cutout of the flange to form an interlocking connection.

17. The laundry appliance of claim 1, wherein the acoustic layer includes gaskets configured to align with the plurality of microphones, respectively, to provide a seal about each of the plurality of microphones.

18. The laundry appliance of claim 1, further comprising:
a visual interface coupled to the door, wherein the visual interface is formed of multiple light circuit board assemblies coupled together.

19. The laundry appliance of claim 18, wherein the light circuit board assemblies are arranged to form a light ring.

20. The laundry appliance of claim 1, further comprising:
a door opening assembly configured to adjust the door to the opened position in response to a voice command.

* * * * *